US012712321B2

(12) United States Patent
Lim et al.

(10) Patent No.: US 12,712,321 B2
(45) Date of Patent: Aug. 18, 2026

(54) SHIELDED ELECTRICAL CONNECTOR

(71) Applicant: 3M INNOVATIVE PROPERTIES COMPANY, St. Paul, MN (US)

(72) Inventors: Chin Hua Lim, Mo Kio (SG); Saujit Bandhu, Sengkang (SG); Kok Hoe Lee, Geylang (SG); Siang Sin Foo, Serangoon (SG)

(73) Assignee: 3M Innovative Properties Company, St. Paul, MN (US)

(*) Notice: Subject to any disclaimer, the term of this patent is extended or adjusted under 35 U.S.C. 154(b) by 433 days.

(21) Appl. No.: 18/569,406

(22) PCT Filed: Jun. 16, 2022

(86) PCT No.: PCT/IB2022/055599
§ 371 (c)(1),
(2) Date: Dec. 12, 2023

(87) PCT Pub. No.: WO2022/264084
PCT Pub. Date: Dec. 22, 2022

(65) Prior Publication Data
US 2024/0250484 A1 Jul. 25, 2024

Related U.S. Application Data

(60) Provisional application No. 63/202,545, filed on Jun. 16, 2021.

(51) Int. Cl.
*H01R 13/6594* (2011.01)
*H01R 12/72* (2011.01)
*H01R 13/405* (2006.01)

(52) U.S. Cl.
CPC ....... *H01R 13/6594* (2013.01); *H01R 12/722* (2013.01); *H01R 13/405* (2013.01)

(58) Field of Classification Search
CPC ......................... H01R 13/6594; H01R 12/722; H01R 13/405; H01R 12/724; H01R 12/712; H01R 13/6582; H01R 13/64
See application file for complete search history.

(56) References Cited

U.S. PATENT DOCUMENTS 6,644,995 B1 11/2003 Jones et al.
7,445,504 B1 * 11/2008 Zhang ................. H01R 12/712 439/607.01

(Continued)

FOREIGN PATENT DOCUMENTS

JP 2009070567 A 4/2009

OTHER PUBLICATIONS

International Search Report for PCT Application No. PCT/IB2022/055599, mailed on Sep. 6, 2022, 3 pages.

*Primary Examiner* — Edwin A. Leon
(74) *Attorney, Agent, or Firm* — Gregg H. Rosenblatt

(57) ABSTRACT

An electrical connector configured to mate with a mating connector along a mating direction includes an electrically insulative unitary housing, pluralities of top and bottom contacts, and an electrically conductive unitary shield. The pluralities of top and bottom contacts are disposed in a central slot at a respective top surface and a bottom surface of the central slot for making contact with corresponding conductive terminals of a tongue of the mating connector. The shield is removably assembled to the housing along the mating direction from a rear side of the housing. The shield includes a base shield substantially covering an entire bottom surface of a bottom wall of the housing, and opposing side shields substantially covering opposing side walls of the housing. The shield leaves substantially an entire top surface of a top wall of the housing and the rear side of the housing exposed.

12 Claims, 16 Drawing Sheets

(56) References Cited

U.S. PATENT DOCUMENTS

| | | | | |
|---|---|---|---|---|
| 10,218,125 | B2 * | 2/2019 | Qiu | H01R 13/64 |
| 10,720,739 | B1 * | 7/2020 | Wu | H01R 13/6585 |
| 2002/0061667 | A1 | 5/2002 | Yu | |
| 2006/0128219 | A1 | 6/2006 | Zhang et al. | |
| 2017/0365955 | A1 * | 12/2017 | Li | H01R 13/5202 |
| 2019/0372251 | A1 | 12/2019 | Huang et al. | |

* cited by examiner

SHIELDED ELECTRICAL CONNECTOR

REFERENCE TO RELATED APPLICATIONS

This application is a national stage filing under 35 U.S.C. 371 of PCT/IB2022/055599, filed Jun. 16, 2022, which claims the benefit of U.S. Provisional Application No. 63/202,545, filed Jun. 16, 2021, the disclosures of which are incorporated by reference in their entireties herein.

TECHNICAL FIELD

The present disclosure relates generally to an electrical connector, and in particular to a shielded electrical connector configured to mate with a mating connector.

BACKGROUND

An electrical connector is generally used with a mating connector to connect a cable from one device (e.g., a server, a network switching system, a client device, etc.) to another device (e.g., another server) for various applications, such as data processing, data transmission, and data reception.

SUMMARY

In one aspect, the present disclosure provides an electrical connector configured to mate with a mating connector along a mating direction. The electrical connector includes an electrically insulative unitary housing including a central slot defined by top, bottom and opposing side walls. The central slot extends along the mating direction between an open front end near a mating side of the housing for receiving a tongue of the mating connector, and open top and bottom rear ends separated by a divider of the housing and disposed near a rear side, opposite the mating side of the housing. The open front and top and bottom rear ends are substantially co-extensive with each other in length extending along a lateral direction substantially orthogonal to the mating direction. The electrical connector further includes pluralities of top and bottom contacts disposed in the central slot at respective top and bottom surfaces of the central slot for making contact with corresponding conductive terminals of the tongue of the mating connector. The electrical connector further includes an electrically conductive unitary shield removably assembled to the housing along the mating direction from the rear side of the housing. The shield includes a base shield substantially covering an entire bottom surface of the bottom wall of the housing and extending forwardly beyond the mating side of the housing to define an exposed planar portion of the base shield. The shield further includes opposing side shields extending upwardly from corresponding opposing side edges of the base shield and substantially covering the corresponding side walls of the housing. Each of the side shields includes a curved first engagement feature at least partially disposed in an opening defined at a corresponding side edge of the top wall. The unitary shield leaves substantially an entire top surface of the top wall of the housing and the rear side of the housing exposed.

In another aspect, the present disclosure provides an electrical connector configured to mate with a mating connector along a mating direction. The electrical connector includes an electrically insulative unitary housing including a central slot extending from an open front end near a mating side of the housing for receiving a tongue of the mating connector to open top and bottom rear ends disposed near a rear side, opposite the mating side of the housing. The open front and top and bottom rear ends are substantially co-extensive with each other in length extending along a lateral direction substantially orthogonal to the mating direction. The electrical connector further includes pluralities of top and bottom contacts. Each of the top and bottom contacts includes a contact portion, a mounting portion, and a middle portion extending between the contact and mounting portions and including two wider portions spaced apart along a length of the middle portion. Each of the wider portions is wider than a segment of the middle portion on each longitudinal end of the wider portion. The electrical connector further includes an electrically conductive unitary shield substantially covering an entire bottom surface of a bottom wall and opposing side walls of the housing, and leaving substantially an entire top surface of a top wall and the rear side of the housing exposed. The electrical connector further includes continuous top and bottom overmolds molded over respective portions of the top and bottom contacts and substantially sealing the respective open top and bottom rear ends of the central slot. The top and bottom overmolds leave the two wider portions of each of the top and bottom contacts exposed.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

Figure 1A:
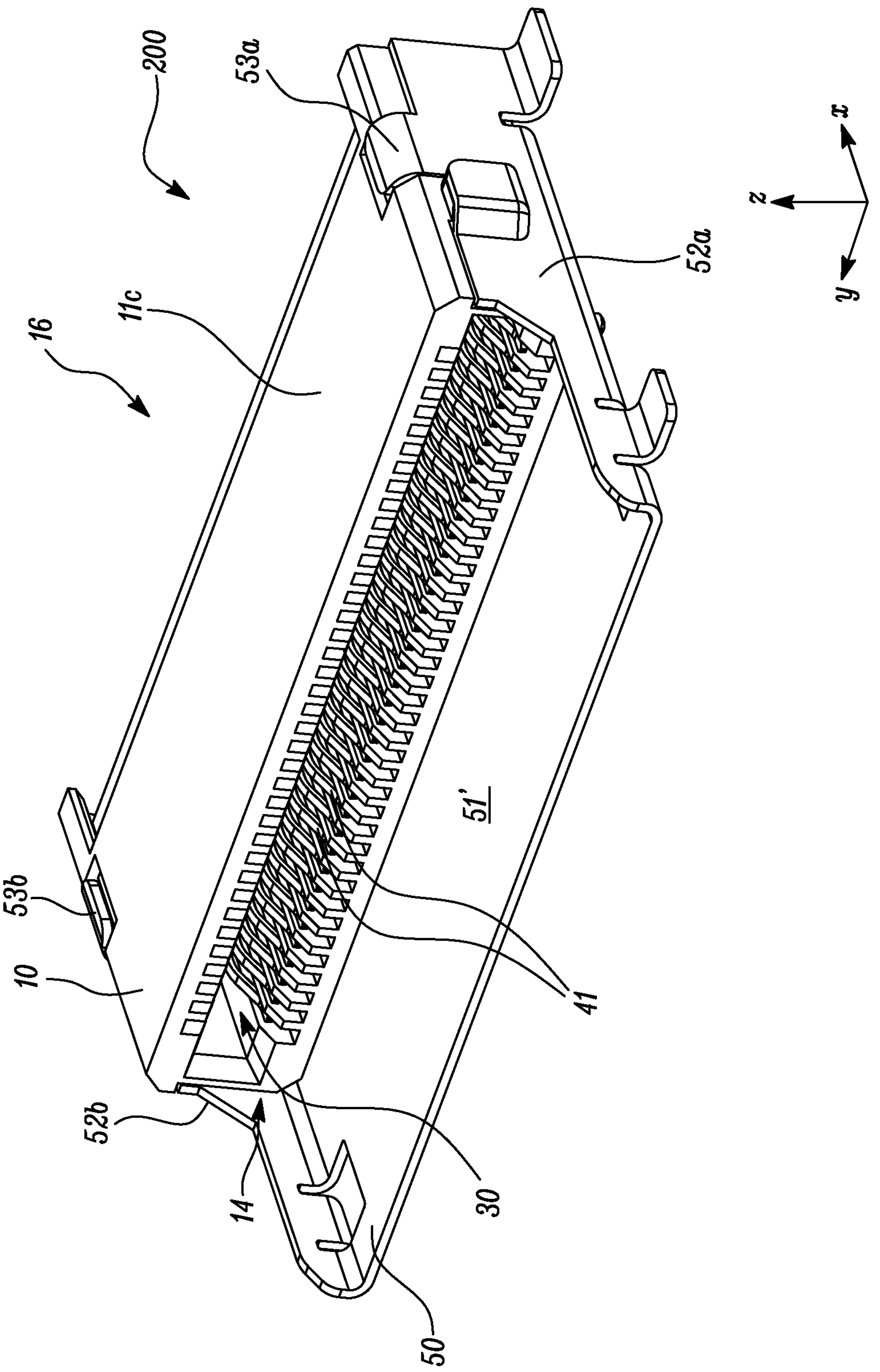
FIG. 1A is a schematic side perspective view of an electrical connector according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As recited herein, all numbers should be considered modified by the term "about". As used herein, "a," "an," "the," "at least one," and "one or more" are used interchangeably.

As used herein as a modifier to a property or attribute, the terms "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

Expansion of data processing and data storage requirements typically causes an increasing demand for facilities (e.g., server rooms) to accommodate growing numbers of servers and supporting equipment. This demand may lead to an emphasis on physical space conservation in the facilities in order to accommodate more servers and more supporting equipment. One or more connector assembly components, such as an electrical connector and a mating connector, typically need to conform to certain industry standards. Further, in some cases, a heat sink may be disposed near conventional electrical connectors. Generally, the conventional electrical connectors cannot be arranged below the heat sink which limits utilization of available space. Further, the conventional electrical connectors may not support high-speed data processing and data storage functions as required by next generation database servers.

The present disclosure provides an electrical connector configured to mate with a mating connector along a mating direction. The electrical connector includes an electrically insulative unitary housing including a central slot defined by top, bottom and opposing side walls. The central slot extends along the mating direction between an open front end near a mating side of the housing for receiving a tongue of the mating connector, and open top and bottom rear ends separated by a divider of the housing and disposed near a rear side, opposite the mating side of the housing. The open front and top and bottom rear ends are substantially co-extensive with each other in length extending along a lateral direction substantially orthogonal to the mating direction. The electrical connector further includes pluralities of top and bottom contacts disposed in the central slot at respective top and bottom surfaces of the central slot for making contact with corresponding conductive terminals of the tongue of the mating connector. The electrical connector further includes an electrically conductive unitary shield removably assembled to the housing along the mating direction from the rear side of the housing. The shield includes a base shield substantially covering an entire bottom surface of the bottom wall of the housing and extending forwardly beyond the mating side of the housing to define an exposed planar portion of the base shield. The shield further includes opposing side shields extending upwardly from corresponding opposing side edges of the base shield and substantially covering the corresponding side walls of the housing. Each of the side shields includes a curved first engagement feature at least partially disposed in an opening defined at a corresponding side edge of the top wall. The unitary shield leaves substantially an entire top surface of the top wall of the housing and the rear side of the housing exposed.

The electrical connector of the present disclosure may have a low profile. Specifically, the electrical connector of the present disclosure may possess a reduced thickness, breadth/width, length, surface area, and/or potential volume than those of conventional electrical connectors. For example, an integration of the unitary housing and the unitary shield in the electrical connector may result in the low profile of the electrical connector. Therefore, the electrical connector may require less physical space than the conventional electrical connectors. In some cases, the electrical connector may conform to certain industry standards.

Further, the electrical connector of the present disclosure may be accommodated in available spaces that may not be utilized in case of conventional connector assemblies, such as below heat sinks. In some cases, the electrical connector may be mounted on a circuit board, within the available space between the heat sink and the circuit board. The electrical connector may further allow easy connection with a mating connector associated with a device or a server (e.g., 1U rack server, blade server, GPU server, etc.). Further, a mating connection between the electrical connector and the mating connector may provide electromagnetic shielding from external devices. Therefore, the electrical connector may be suitable for use in high-speed data processing and data storage applications.

Moreover, the electrical connector of the present disclosure may prevent accidental disconnection of the mating connector. An undesirable relative movement between the electrical connector and the mating connector in the fully mated state may also be prevented to ensure seamless connectivity between the electrical connector and the mating connector. The electrical connector may also be easily mated with the mating connector.

Figure 1B:
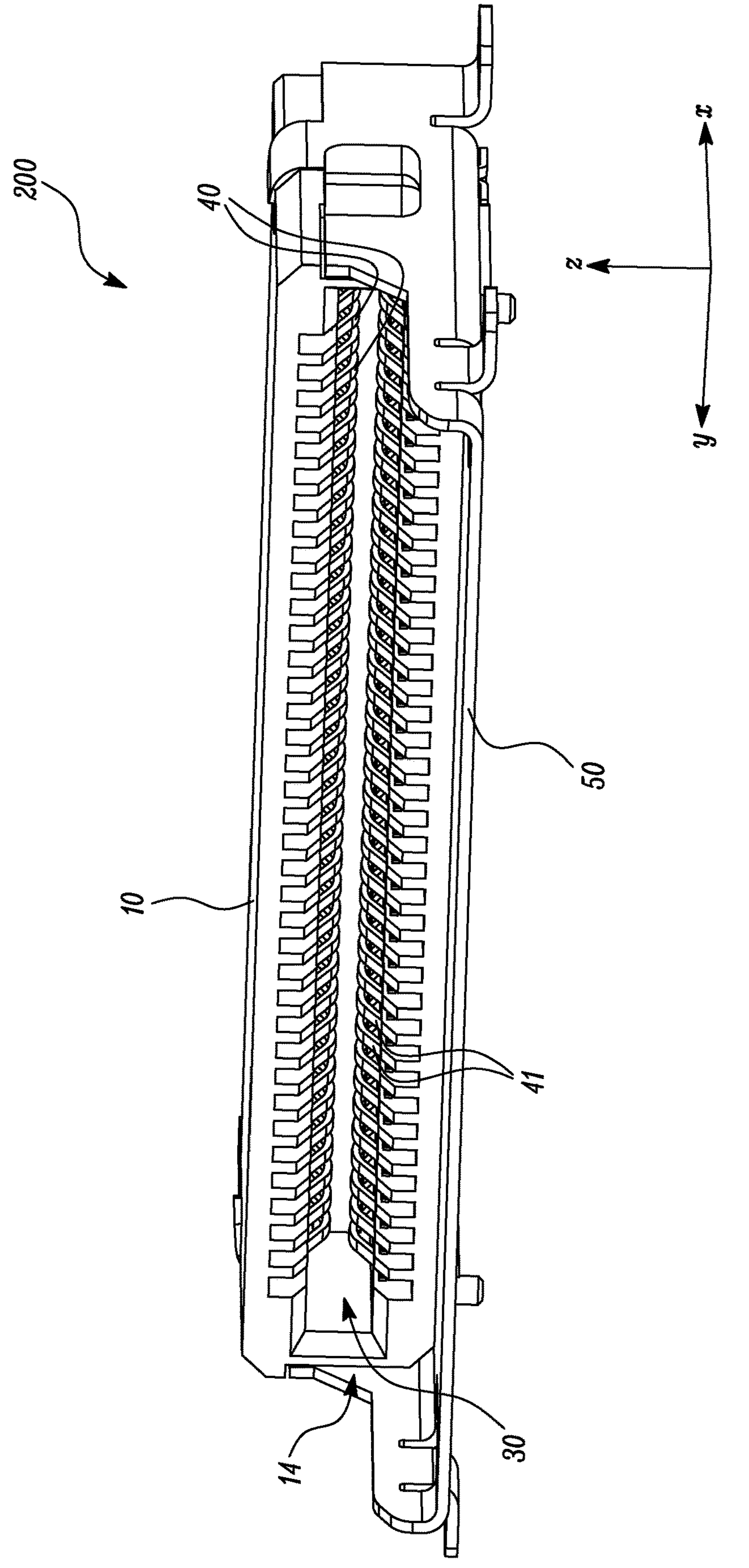
FIG. 1B is a schematic front perspective view of the electrical connector according to an embodiment of the present disclosure.

Referring to Figures, FIGS. 1A and 1B illustrate a side perspective view and a front perspective view, respectively, of an electrical connector 200 according to an embodiment of the present disclosure.

The electrical connector 200 defines mutually orthogonal x, y, and z-axes. The x-axis is defined along a length of the electrical connector 200, while the y-axis is defined along a breadth of the electrical connector 200. The z-axis is defined along a thickness of the electrical connector 200.

The electrical connector 200 is configured to mate with a mating connector 300 (shown in FIGS. 8A-8C) along a mating direction. In the illustrated embodiment of FIGS. 1A and 1B, the mating direction is substantially along the x-axis.

The electrical connector 200 includes an electrically insulative unitary housing 10 (interchangeably referred to as "the housing 10"). The housing 10 has a mating side 14 and a rear side 16 opposite to the mating side 14. In the present disclosure, the mating side 14 and the rear side 16 of the housing 10 may be interchangeably referred to the mating side 14 and the rear side 16 of the electrical connector 200.

In the illustrated embodiment of FIGS. 1A and 1B, the housing 10 has a generally rectangular shape. However, in some other embodiments, the housing 10 may have any suitable shape, as per desired applications attributes. Further, the housing 10 may be made of any suitable electrically insulative material, such as a composite, a plastic, a dielectric material, and so forth. In some embodiments, the housing 10 may include a polymeric resin.

The housing 10 includes a central slot 30. The electrical connector 200 further includes pluralities of top and bottom contacts 40, 41 disposed in the central slot 30.

The electrical connector 200 further includes an electrically conductive unitary shield 50 (interchangeably referred to as "the unitary shield 50") removably assembled to the housing 10 along the mating direction from the rear side 16 of the housing 10. The unitary shield 50 may be made of any suitable electrically conductive material, for example, a metal or a metal alloy, such as aluminum, copper, steel, and so forth.

In some embodiments, the electrical connector 200 may conform to the Octal Small Format Pluggable (OSFP) form factor defined by an industry standard created by a committee known as an MSA (Multi-Source Agreement).

Figure 2A:
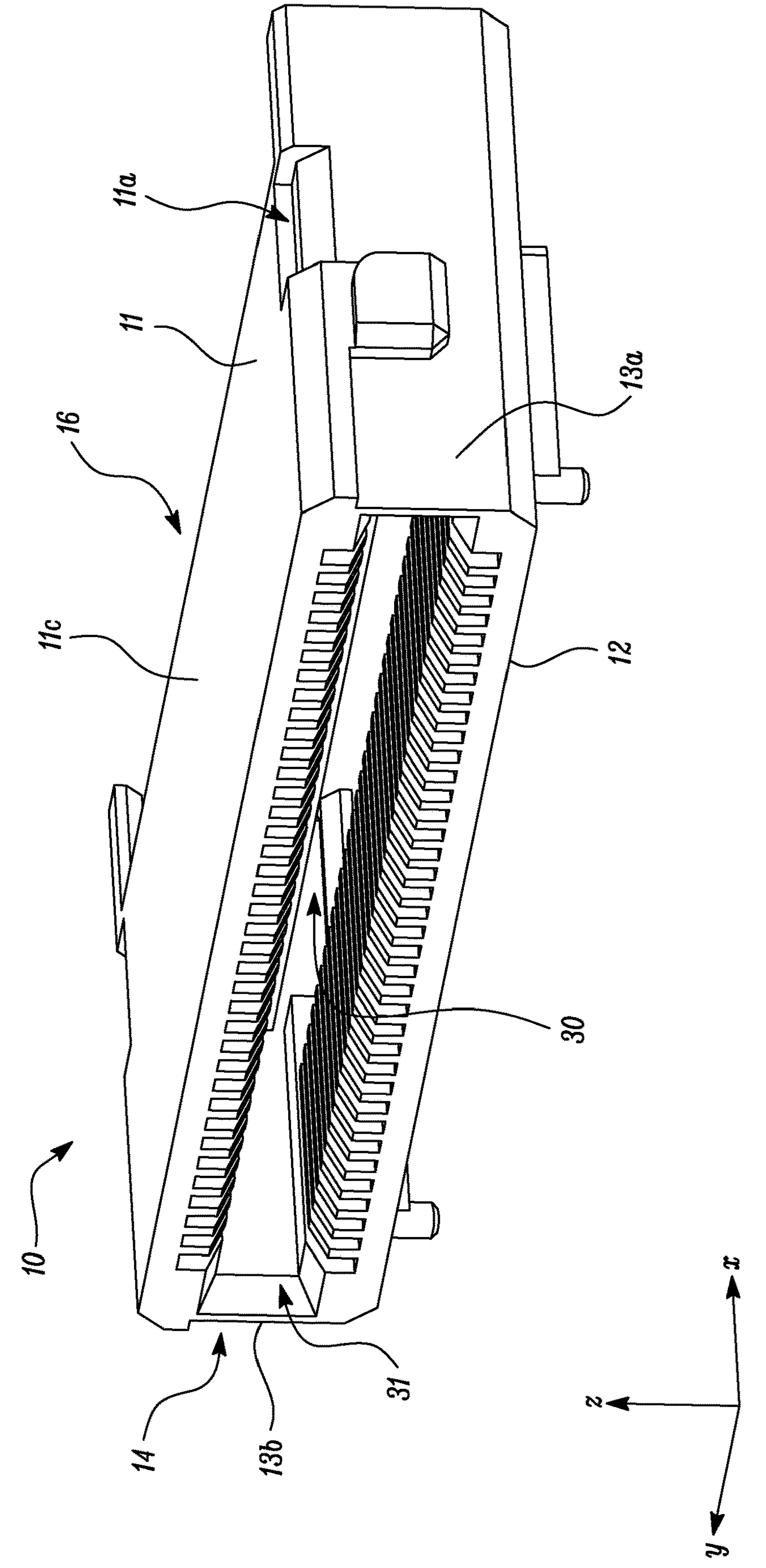
FIG. 2A is a schematic front side perspective view of an electrically insulative unitary housing of the electrical connector according to an embodiment of the present disclosure.
Figure 2B:
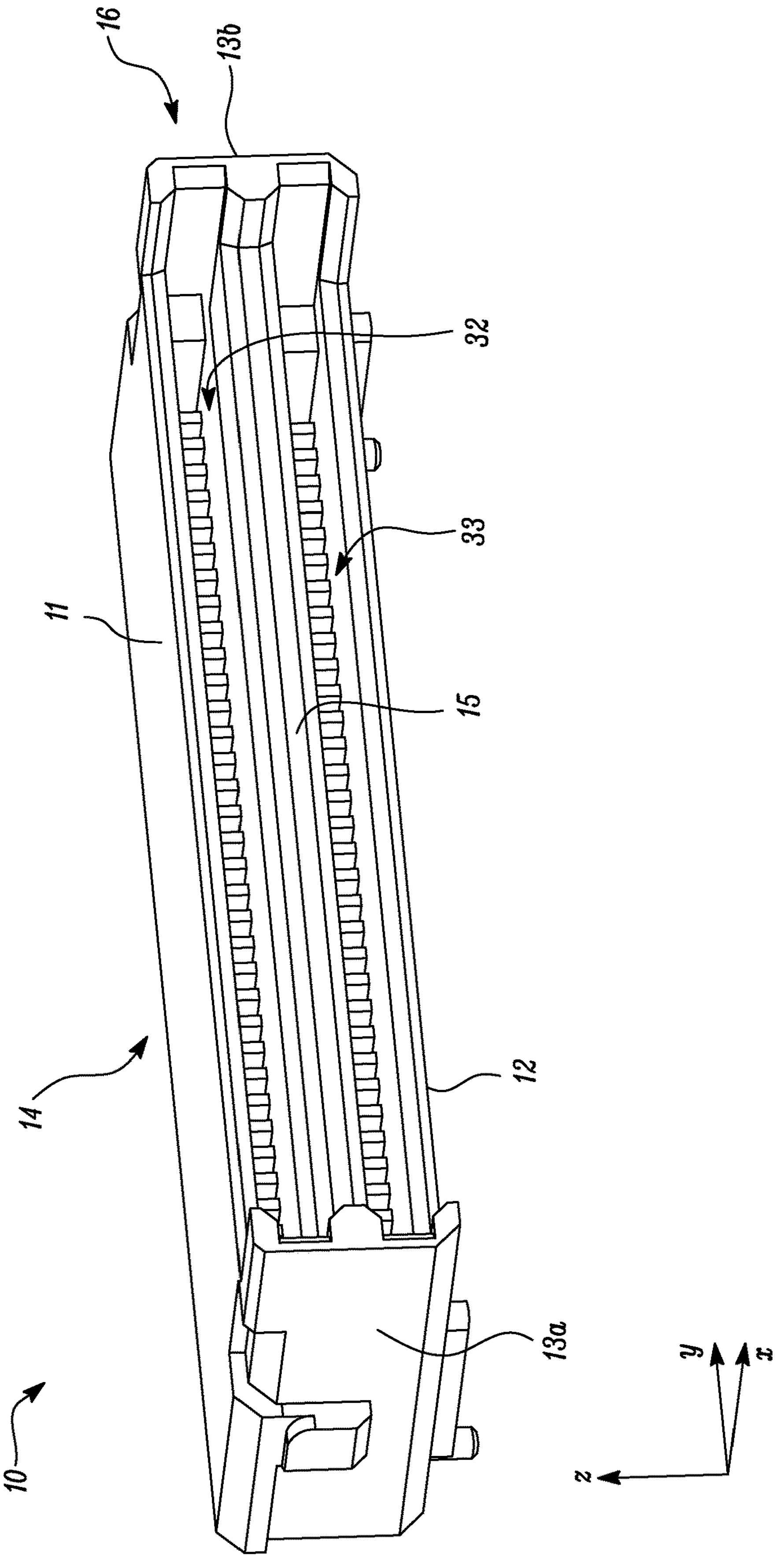
FIG. 2B is a schematic rear side perspective view of the unitary housing according to an embodiment of the present disclosure.
Figure 2C:
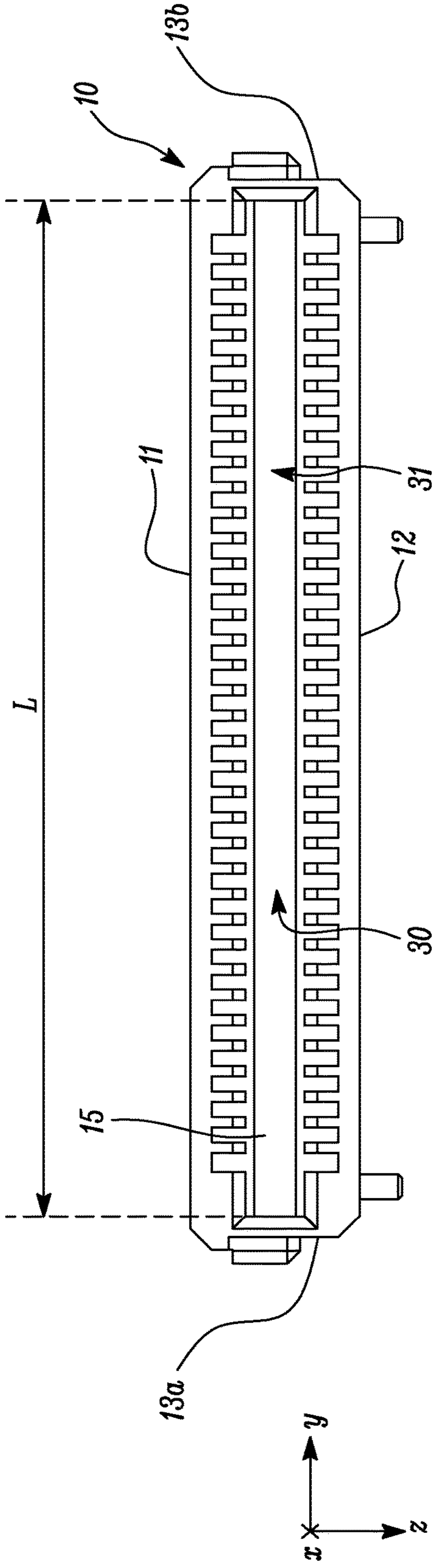
FIG. 2C is a schematic front view of the unitary housing according to an embodiment of the present disclosure.
Figure 2D:
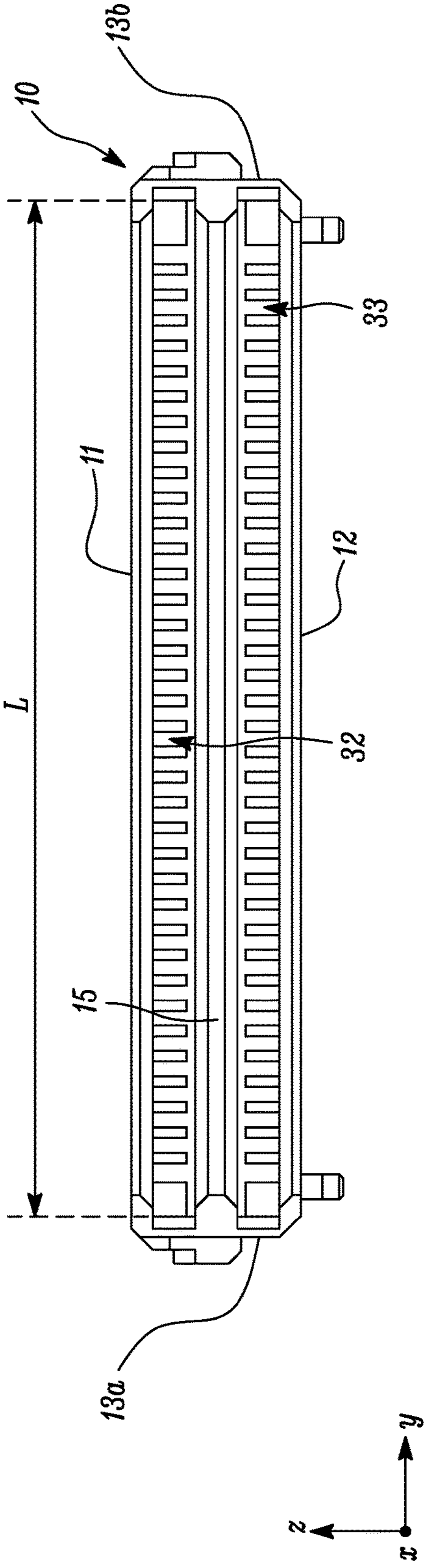
FIG. 2D is a schematic rear view of the unitary housing according to an embodiment of the present disclosure.

FIGS. 2A to 2D illustrate different schematic views of the housing 10 according to an embodiment of the present disclosure. Specifically, FIGS. 2A and 2B illustrate a front side perspective view and a rear side perspective view, respectively, of the housing 10. Further, FIGS. 2C and 2D illustrate a front view and a rear view, respectively, of the housing 10.

Referring to FIGS. 2A and 2B, the housing 10 includes a top wall 11, a bottom wall 12, and opposing side walls 13*a*, 13*b*. Specifically, the opposing side walls 13*a*, 13*b* of the housing 10 include a first side wall 13*a*, and a second side wall 13*b* opposing the first side wall 13*a*.

In the illustrated embodiment of FIGS. 2A and 2B, each of the top wall 11, the bottom wall 12, and the opposing side walls 13*a*, 13*b* is substantially planar. However, in some other embodiments, one or more of the top wall 11, the bottom wall 12, and the opposing side walls 13, 13*b* may be curved.

The central slot 30 is defined by the top wall 11, the bottom wall 12, the first side wall 13*a*, and the second side wall 13*b* of the housing 10.

The central slot 30 extends along the mating direction between an open front end 31 near the mating side 14 of the housing 10 for receiving a tongue 310 (shown in FIG. 8A) of the mating connector 300 (shown in FIG. 8A) and open top and bottom rear ends 32, 33 separated by a divider 15 of the housing 10 and disposed near the rear side 16, opposite the mating side 14 of the housing 10. In some embodiments, the divider 15 extends continuously between the opposing side walls 13*a*, 13*b* of the housing 10.

Referring to FIGS. 2C and 2D, the open front and top and bottom rear ends 31, 32, 33 are substantially co-extensive with each other in a length L extending along a lateral direction substantially orthogonal to the mating direction. In the illustrated embodiment of FIGS. 2C and 2D, the lateral direction is substantially along the y-axis.

Figure 3:
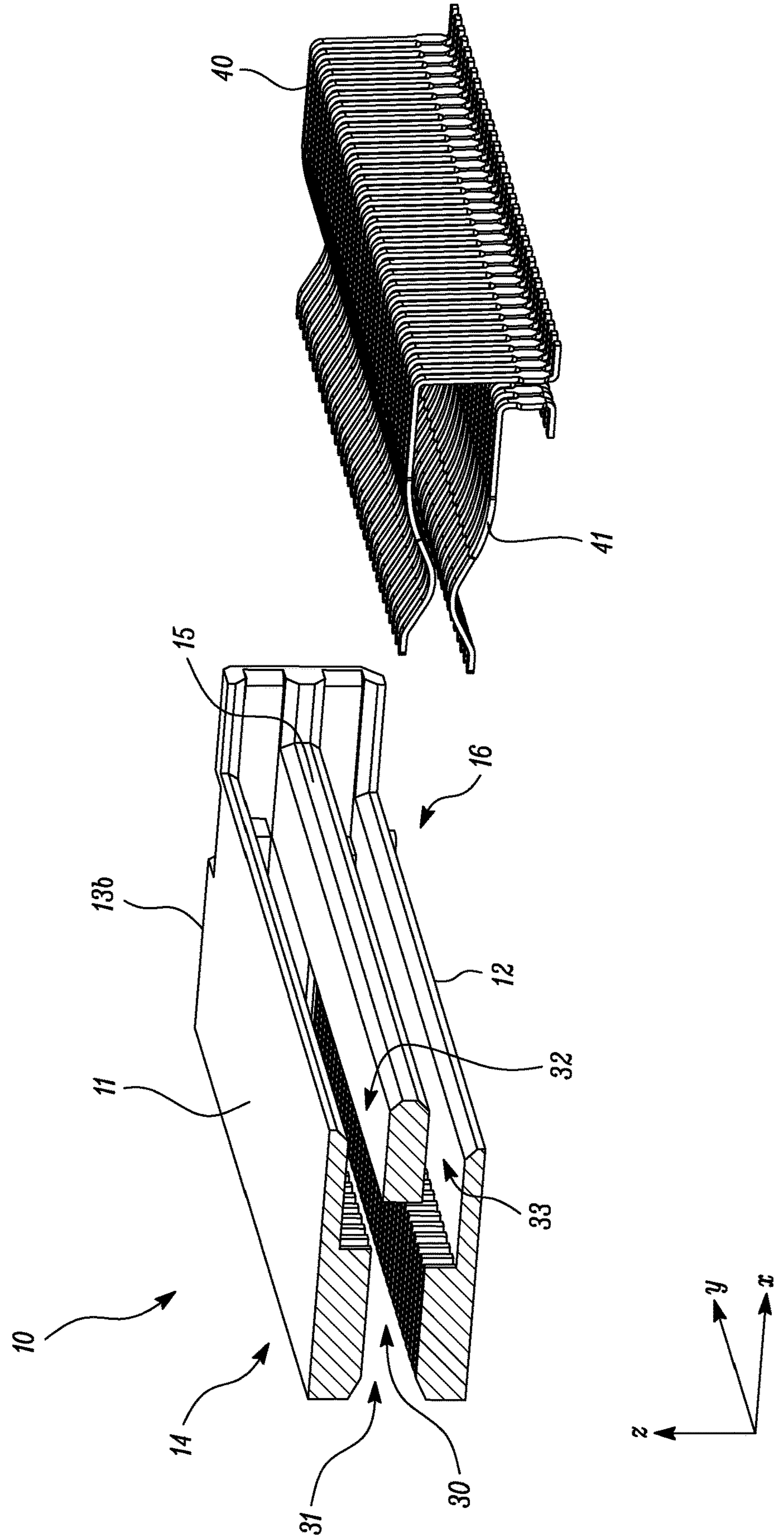
FIG. 3 is a schematic cross-sectional exploded side perspective view of the unitary housing and pluralities of top and bottom contacts of the electrical connector according to an embodiment of the present disclosure.

FIG. 3 illustrates a cross-sectional exploded view of the housing 10 and the pluralities of top and bottom contacts 40, 41 according to an embodiment of the present disclosure.

In some embodiments, a portion of each of the plurality of top contacts 40 and the plurality of bottom contacts 41 may be configured to be disposed in the open front end 31 for making contact with a corresponding conductive terminal 311 (shown in FIG. 8A) of the tongue 310 of the mating connector 300. In some embodiments, the plurality of top contacts 40 and the plurality of bottom contacts 41 may include an electrically conductive material, such as a metal or an alloy, including, but not limited to, tin, nickel, silver, steel, brass, etc. In an example, the plurality of top contacts 40 and the plurality of bottom contacts 41 may include copper.

In some embodiments, a portion of each of the plurality of top contacts 40 may be configured to be disposed in the open top rear end 32. In some embodiments, a portion of each of the plurality of bottom contacts 41 may be configured to be disposed in the open bottom rear end 33. Further, in some embodiments, at least a portion of each of the plurality of top contacts 40 may be separated from at least a portion of each of the plurality of bottom contacts by the divider 15.

Figure 4A:
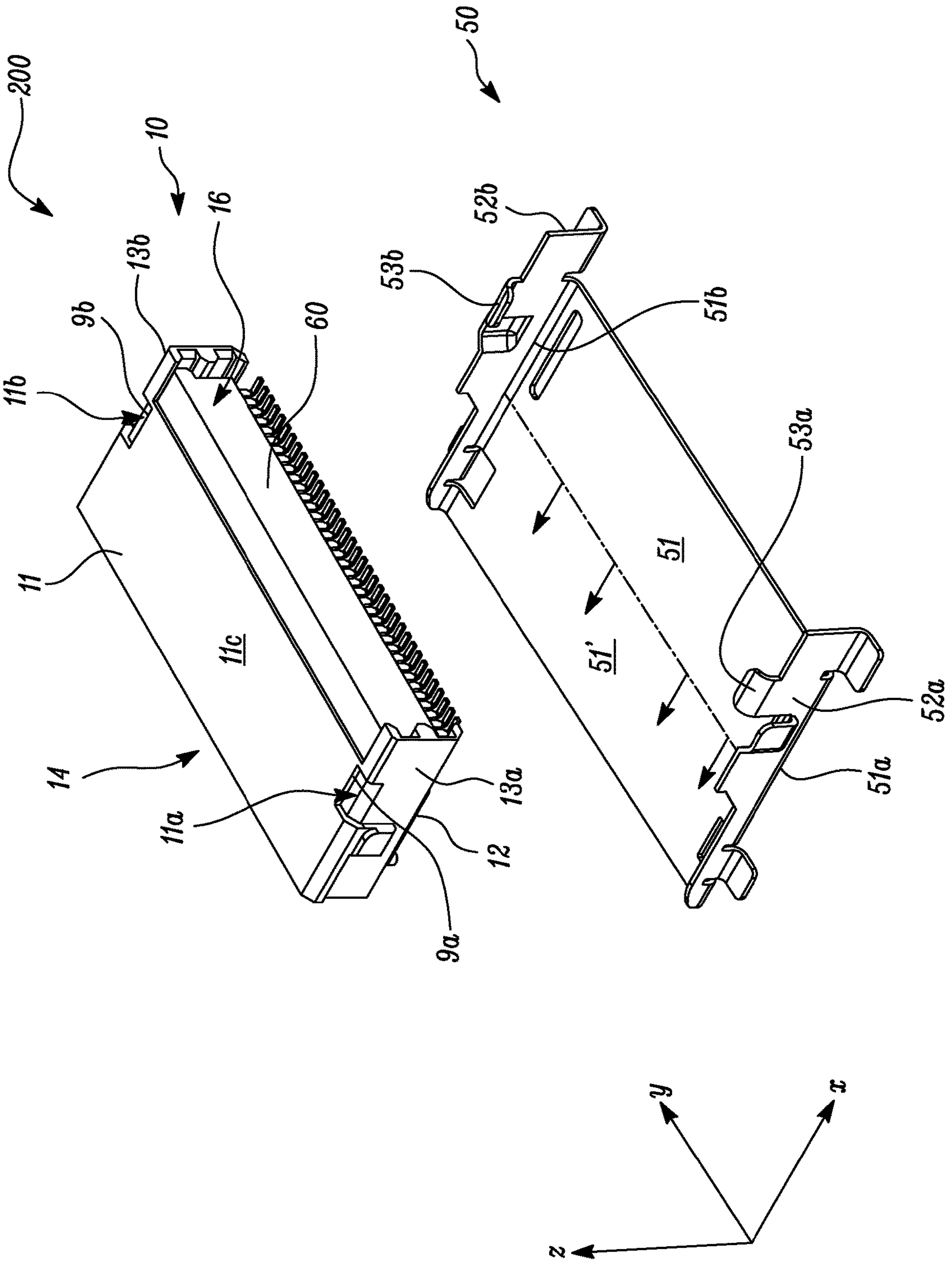
FIG. 4A is a schematic top exploded perspective view of the electrical connector according to an embodiment of the present disclosure.
Figure 4B:
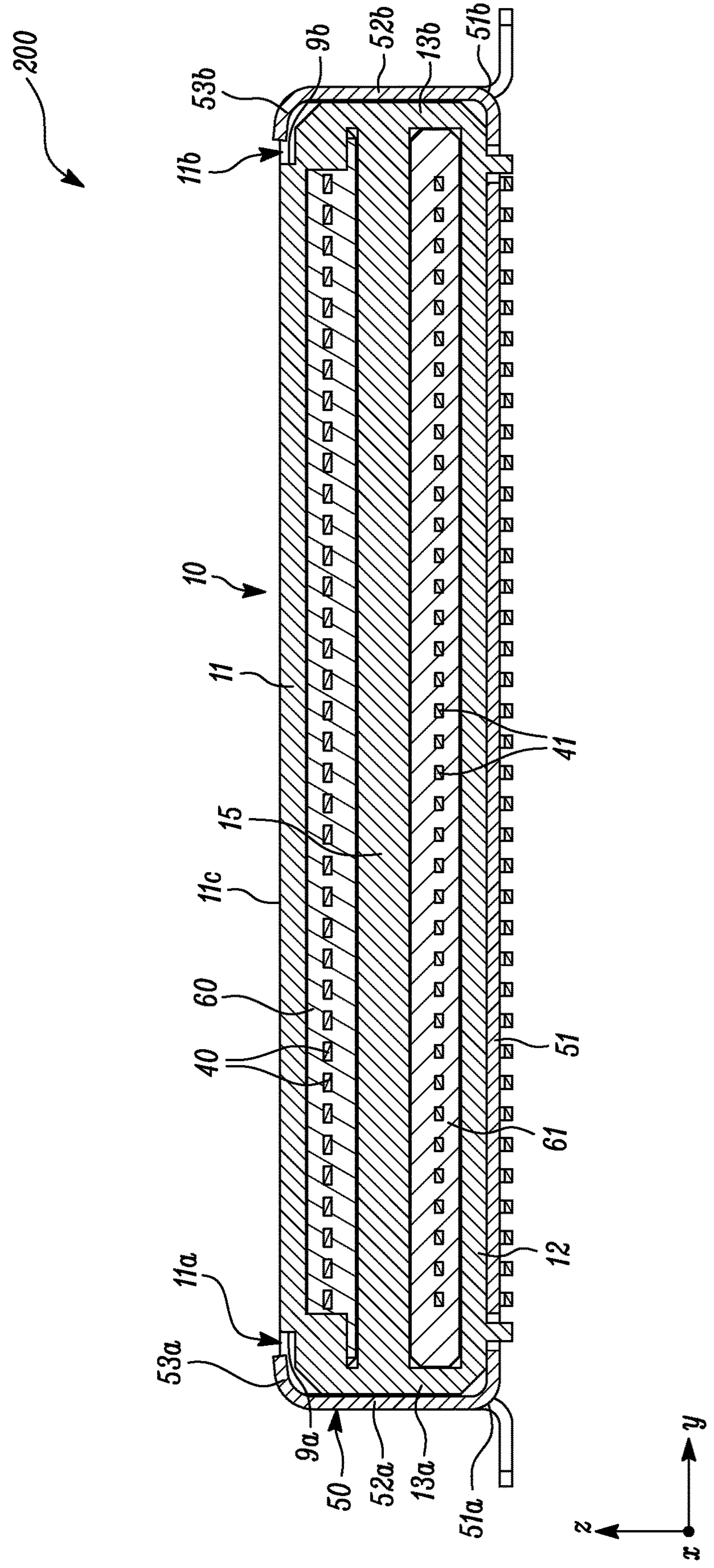
FIG. 4B is a schematic cross-sectional rear view of the electrical connector according to an embodiment of the present disclosure.
Figure 4D:
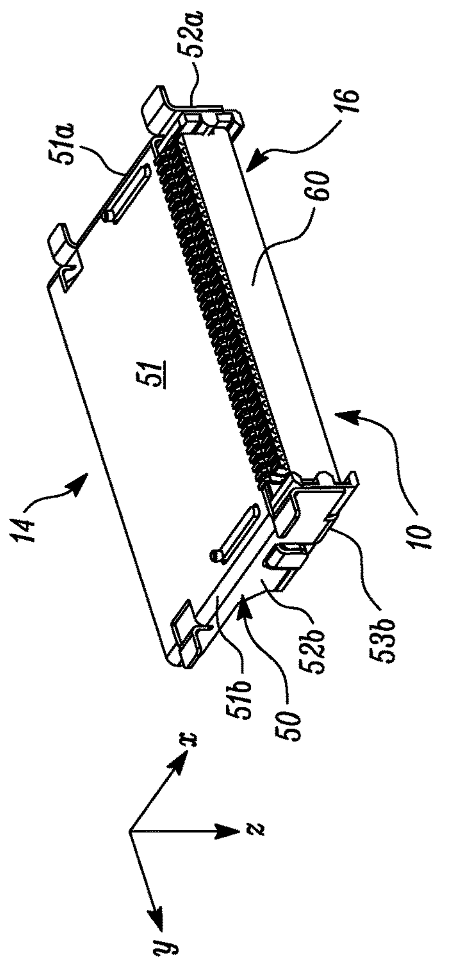
FIG. 4D is a schematic bottom perspective view of the electrical connector according to an embodiment of the present disclosure.
Figure 4C:
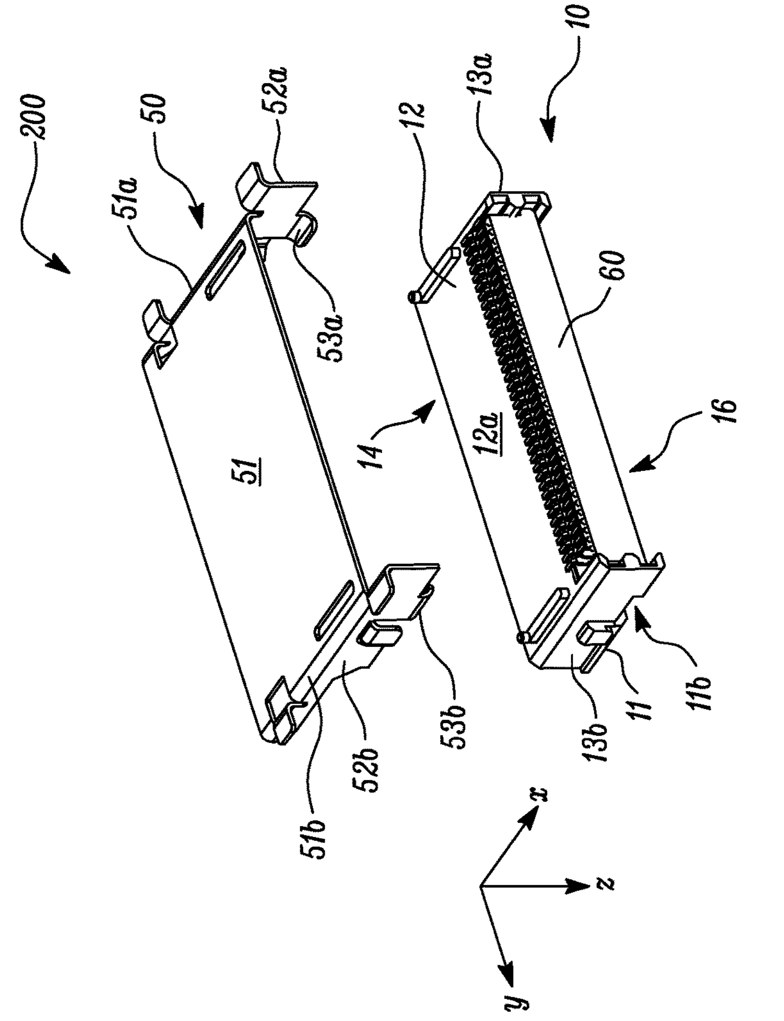
FIG. 4C is a schematic bottom exploded perspective view of the electrical connector according to an embodiment of the present disclosure.

FIGS. 4A to 4D illustrate different views of the electrical connector 200 according to an embodiment of the present disclosure. Specifically, FIG. 4A illustrates a top exploded perspective view of the electrical connector 200, FIG. 4B illustrates a rear cross-sectional view of the electrical connector 200, FIG. 4C illustrates a bottom exploded perspective view of the electrical connector 200, and FIG. 4D illustrates a bottom perspective view of the electrical connector 200.

Referring to FIGS. 4A and 4B, the unitary shield 50 includes a base shield 51 and opposing side shields 52*a*, 52*b*.

The base shield 51 extends forwardly beyond the mating side 14 of the housing 10 to define an exposed planar portion 51' (demarcated by a dashed line in FIG. 4A) of the base shield 51. FIG. 1A also illustrates the exposed planar portion 51' of the base shield 51 extending forwardly beyond the mating side 14 of the housing 10.

The base shield 51 further includes opposing side edges 51*a*, 51*b*. Specifically, the opposing side edges 51*a*, 51*b* include a first side edge 51*a* and a second side edge 51*b* opposing the first side edge 51*a*. Further, the opposing side shields 52*a*, 52*b* include a first side shield 52*a* and a second side shield 52*b* opposing the first side shield 52*a*. The opposing side shields 52*a*, 52*b* extend upwardly from corresponding opposing side edges 51*a*, 51*b* of the base shield 51. Specifically, the first side shield 52*a* extends upwardly from the first side edge 51*a*, and the second side shield 52*b* extends upwardly from the first side edge 51*b*.

The opposing side shields 52*a*, 52*b* may act as alignment guides to facilitate mating between the electrical connector 200 and the mating connector 300 (shown in FIGS. 8A-8C) along the mating direction. Specifically, portions of the opposing side shields 52*a*, 52*b* adjacent to the exposed planar portion 51' may act as the alignment guides to facilitate the mating between the electrical connector 200 and the mating connector 300 along the mating direction. Therefore, the opposing side shields 52*a*, 52*b* may avoid misalignment between the electrical connector 200 and the mating connector 300, thereby preventing any accidental damage to the electrical connector 200 and the mating connector 300 due to misalignment.

The opposing side shields 52*a*, 52*b* substantially cover the corresponding side walls 13*a*, 13*b* of the housing 10. Specifically, the first side shield 52*a* substantially covers the first side wall 13*a* of the housing 10, and the second side shield 52*b* substantially covers the second side wall 13*b* of the housing 10. Further, the unitary shield 50 leaves substantially an entire top surface 11*c* (also shown in FIGS. 1A and 2A) of the top wall 11 of the housing 10 and the rear side 16 of the housing 10 exposed.

The housing 10 defines a first opening 11*a* at a first side edge 9*a* of the top wall 11 and a second opening 11*b* at a second side edge 9*b* of the top wall 11. In the illustrated embodiment of FIGS. 4A and 4B, the first side edge 9*a* of the top wall 11 is proximal to the first side wall 13*a* of the housing 10, and the second side edge 9*b* of the top wall 11 is proximal to the second side wall 13*b* of the housing 10.

Each of the side shields 52*a*, 52*b* includes a curved first engagement feature 53*a*, 53*b*. Specifically, in the illustrated embodiment of FIGS. 4A to 4D, the first side shield 52*a* includes a curved first engagement feature 53*a*, and the second side shield 52*b* includes a curved first engagement feature 53*b*. FIG. 1A also illustrates the curved first engagement features 53*a*, 53*b* of the respective side shields 52*a*, 52*b* engaged with the housing 10.

The curved first engagement feature 53*a*, 53*b* is at least partially disposed in the opening 11*a*, 11*b* defined at the corresponding side edge 9*a*, 9*b* of the top wall 11. Specifically, the curved first engagement feature 53*a* is at least partially disposed in the first opening 11*a* defined at the first side edge 9*a* of the top wall 11. Further, the curved first engagement feature 53*b* is at least partially disposed in the second opening 11*b* defined at the second side edge 9*b* of the top wall 11. The curved first engagement features 53*a*, 53*b* may prevent undesirable movement between the unitary shield 50 and the housing 10 during use of the electrical connector 200 along the mating direction and also along a thickness direction (i.e., along the z-axis) of the electrical connector 200.

As discussed above, the unitary shield 50 is removably assembled to the housing 10 along the mating direction from the rear side 16 of the housing 10. The unitary shield 50 may be slidably assembled to the housing 10 along the mating direction from the rear side 16 of the housing 10. Upon slidable assembly of the unitary shield 50 to the housing 10, the first side shield 52*a* and the second side shield 52*b* may flex away from each other about the first and second side edges 51*a*, 51*b*, respectively, to receive the housing 10. Further, the first side shield 52*a* and the second side shield 52*b* may flex toward each other about the first and second side edges 51*a*, 51*b*, respectively, such that the curved first engagement feature 53*a* is at least partially disposed in the opening 11*a*, and the curved first engagement feature 53*b* is at least partially disposed in the opening 11*b*. Therefore, the curved first engagement features 53*a*, 53*b* may facilitate assembling of the unitary shield 50 to the housing 10. Further, the curved first engagement features 53*a*, 53*b* may ensure proper positioning of the unitary shield 50 with respect to the housing 10 upon assembly thereof.

In the illustrated embodiment of FIG. 4B, the electrical connector 200 further includes a continuous top overmold 60 (interchangeably referred to as "the top overmold 60") molded over a portion of each of the top contacts 40. In some embodiments, the top overmold 60 substantially seals the open top rear end 32 (shown in FIG. 3) of the central slot 30. Further, in the illustrated embodiment of FIG. 4B, the electrical connector 200 further includes a continuous bottom overmold 61 (interchangeably referred to as "the bottom overmold 61") molded over a portion of each of the bottom contacts 41. In some embodiments, the bottom overmold 61 substantially seals the open bottom rear end 33 (shown in FIG. 3) of the central slot 30. In other words, in some embodiments, the top and bottom overmolds 60, 61 are molded over respective portions of the top and bottom contacts 40, 41 and substantially seal the respective open top and bottom rear ends 31, 32 of the central slot 30. In some embodiments, the top overmold 60 and the bottom overmold 61 include a polymeric resin.

Referring to FIGS. 4C and 4D, the unitary shield 50 substantially covers an entire bottom surface 12*a* of the bottom wall 12 of the housing 10. Therefore, the unitary shield 50 substantially covers the entire bottom surface 12*a* of the bottom wall 12 and the opposing sides walls 13*a*, 13*b* of the housing, and leaves substantially the entire top surface 11*c* (shown in FIGS. 4A and 4B) of the top wall 11 of the housing 10 and the rear side 16 of the housing 10 exposed.

Figure 5:
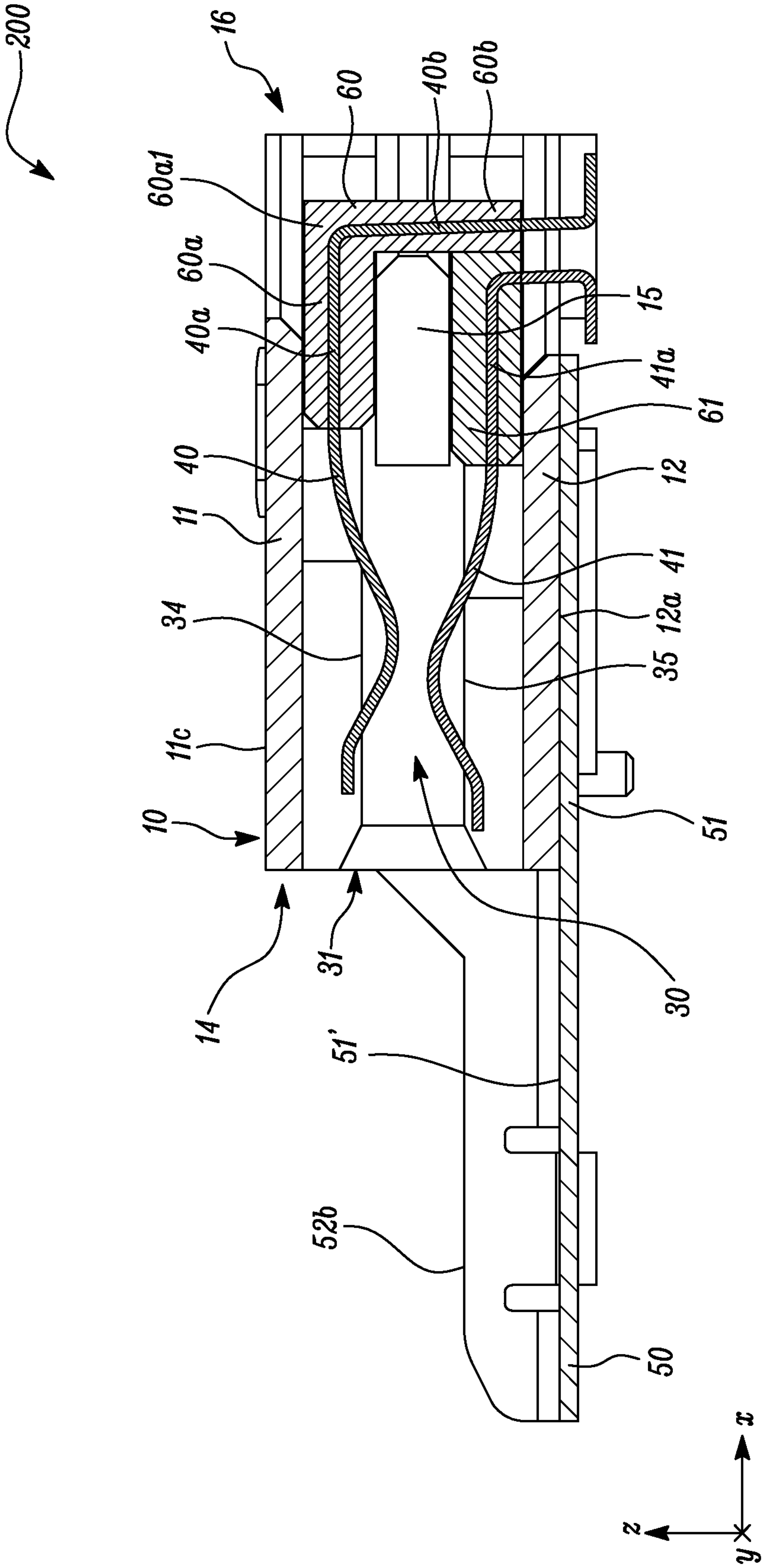
FIG. 5 is a schematic cross-sectional side view of the electrical connector according to an embodiment of the present disclosure.

FIG. 5 illustrates a cross-sectional side view of the electrical connector 200 according to an embodiment of the present disclosure.

The central slot 30 includes a top surface 34 and a bottom surface 35. As discussed above, the electrical connector 200 includes the pluralities of top and bottom contacts 40, 41 disposed in the central slot 30. Specifically, the electrical connector 200 includes the pluralities of top and bottom contacts 40, 41 disposed in the central slot 30 at the respective top and bottom surface 34, 35 of the central slot 30 for making contact with the corresponding conductive terminals 311 (shown in FIG. 8A) of the tongue 310 of the mating connector 300.

In the illustrated embodiment of FIG. 5, the top overmold 60 is molded over a portion 40*a*, 40*b* of each of the top contacts 40. Specifically, in the illustrated embodiment of FIG. 5, the top overmold 60 has a first portion 60*a* substantially parallel to the mating and lateral directions and molded over a first portion 40*a* of each of the top contacts 40. Moreover, in the illustrated embodiment of FIG. 5, the top overmold 60 further includes a second portion 60*b* extending downwardly from an end 60*al* of the first portion 60*a* and molded over a different second portion 40*b* of each of the top contacts 40. In the illustrated embodiment of FIG. 5, the top overmold 60 is substantially L-shaped. Specifically, in the illustrated embodiment of FIG. 5, the top overmold 60 is substantially L-shaped in the x-z plane. The top overmold 60 including the first portion 60*a* and the second portion 60*b* may be a single integral part.

Further, in the illustrated embodiment of FIG. 5, the bottom overmold 61 is molded over a portion 41*a* of each of the bottom contacts 41. In the illustrated embodiment of FIG. 5, the top and bottom overmolds 60, 61 are molded over respective portions 40*a*, 40*b*, 41*a* of the top and bottom contacts 40, 41 and substantially seal the respective open top and bottom rear ends 31, 32 (shown in FIG. 3) of the central slot 30.

The top overmold 60 may ensure proper positioning of the plurality of top contacts 40 in the central slot 30, and the bottom overmold 61 may ensure proper positioning of the plurality of bottom contacts 41 in the central slot 30. In some cases, the top overmold 60 and the bottom overmold 61 may prevent electrical contact (i.e., shorting) between the top and bottom contacts 40, 41. Further, the top overmold 60 and the bottom overmold 61 may be used to control a distance between the top and bottom contacts 40, 41.

Figure 6:
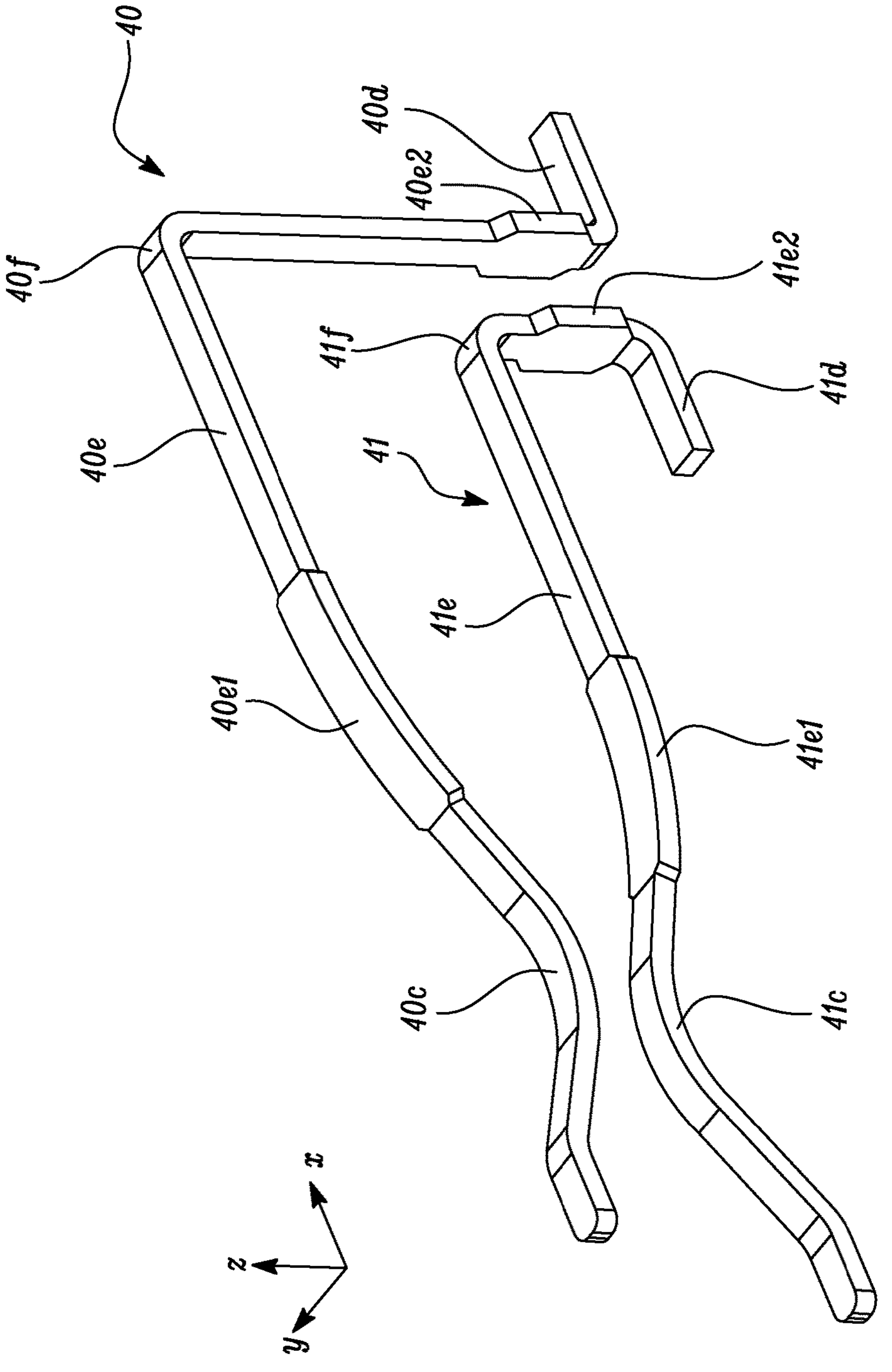
FIG. 6 is a schematic perspective side view of one of each of the pluralities of top and bottom contacts of the electrical connector according to an embodiment of the present disclosure.

FIG. 6 illustrates a perspective side view of one of each of the pluralities of top and bottom contacts 40, 41. Further, FIGS. 7A and 7B illustrate a side view and a top perspective view, respectively, of the pluralities of top and bottom contacts 40, 41 and the top and bottom overmolds 60, 61, with other elements of the electrical connector 200 (shown in FIG. 5) not shown.

Figure 7A:
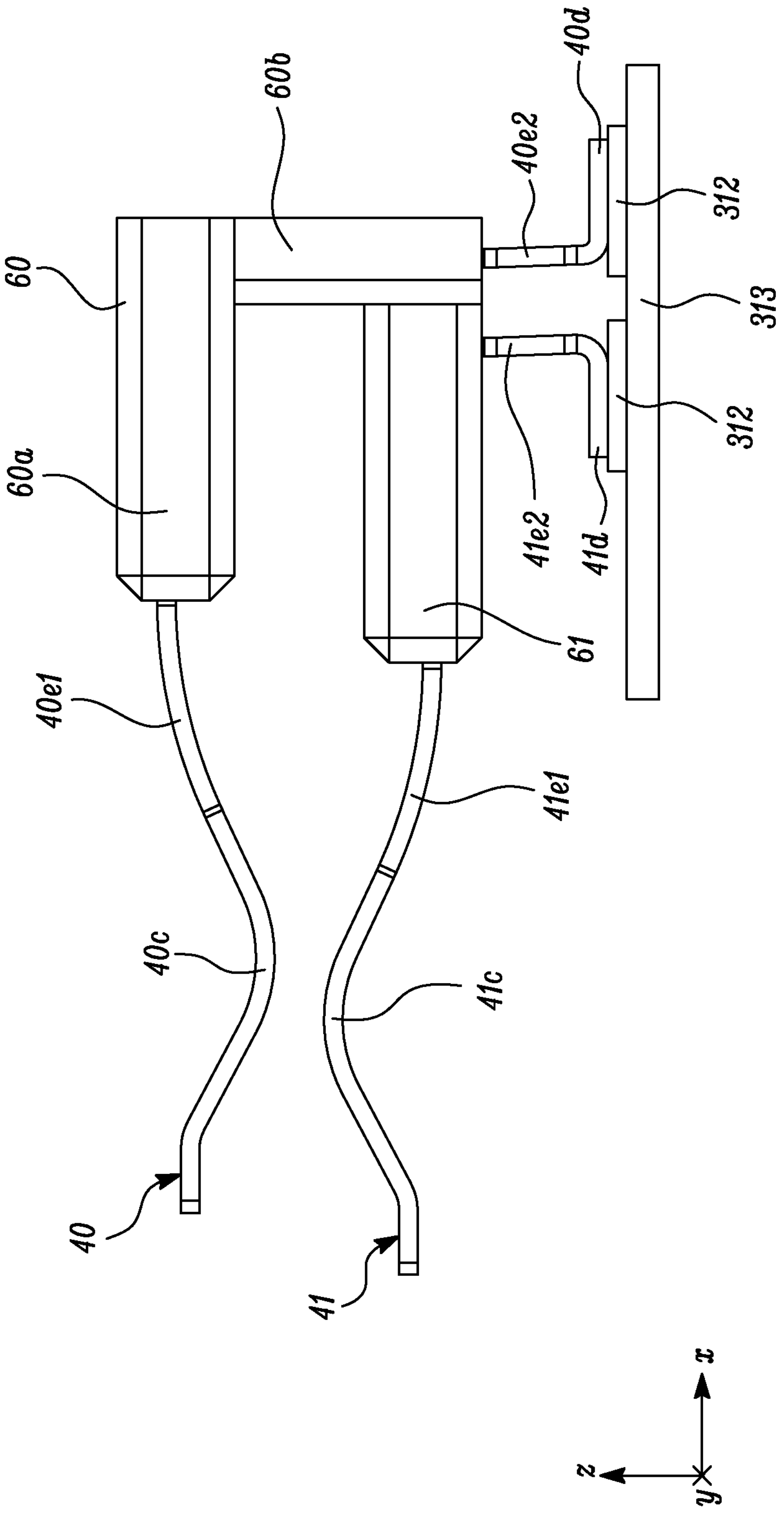
FIG. 7A is a schematic side view of the pluralities of top and bottom contacts, top and bottom overmolds of the electrical connector, and a second circuit board according to an embodiment of the present disclosure.
Figure 7B:
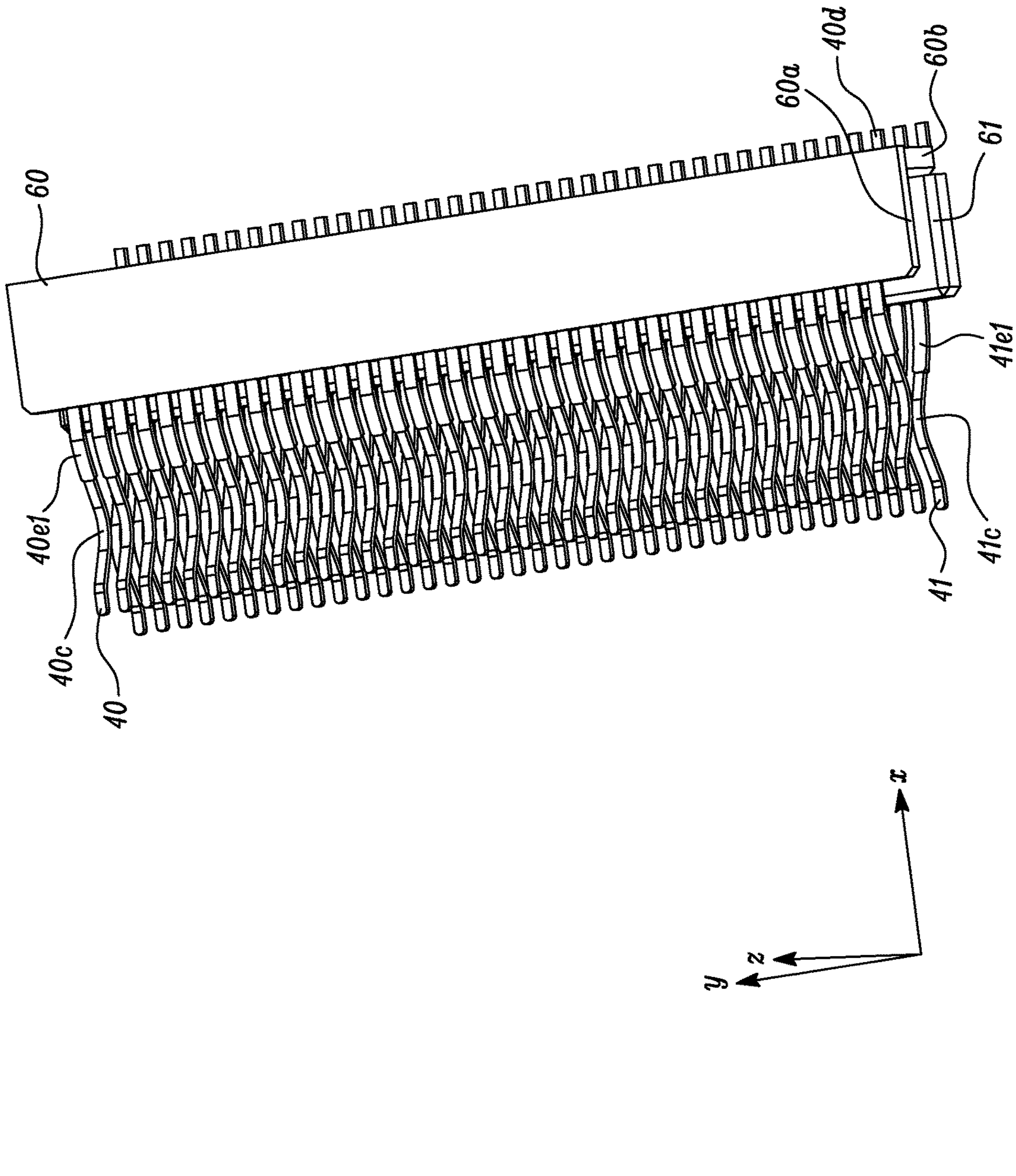
FIG. 7B is a schematic top perspective view of the pluralities of top and bottom contacts and the top and bottom overmolds of the electrical connector according to an embodiment of the present disclosure.

Referring to FIGS. 6, 7A, and 7B, in some embodiments, each of the top and bottom contacts 40, 41 includes a contact portion 40*c*, 41*c* for making contact with the corresponding conductive terminal 311 (shown in FIG. 8A) of the tongue 310 of the mating connector 300. Further, each of the bottom contacts 41 includes the contact portion 41*c* for making contact with the corresponding conductive terminal 311 of the tongue 310 of the mating connector 300.

In some embodiments, each of the top and bottom contacts 40, 41 further includes a mounting portion 40*d*, 41*d* for making contact with a corresponding conductive trace 312 of a second circuit board 313. Specifically, in the illustrated embodiment of FIGS. 6 and 7A, each of the top contacts 40 includes the mounting portion 40*d* for making contact with the corresponding conductive trace 312 of the second circuit board 313. Further, in the illustrated embodiment of FIGS. 6 and 7A, each of the bottom contacts 41 includes the mounting portion 41*d* for making contact with the corresponding conductive trace 312 of the second circuit board 313. In some embodiments, the second circuit board 313 may be a printed circuit board (PCB).

In some embodiments, each of the top and bottom contacts 40, 41 further includes a middle portion 40*e*, 41*e* extending between the contact portion 40*c*, 41*c* and the mounting portion 40*d*, 41*d*. In the illustrated embodiment of FIG. 6, each of the top contacts 40 includes the middle portion 40*e* extending between the contact portion 40*c* and the mounting portion 40*d*, and each of the bottom contacts 41 includes the middle portion 41*e* extending between the contact portion 41*c* and the mounting portion 41*d*.

In some embodiments, the middle portion 40*e* includes two wider portions 40*e*1, 40*e*2 spaced apart along a length of the middle portion 40*e*. In some embodiments, each of the wider portions 40*e*1, 40*e*2 is wider than a segment of the middle portion 40*e* on each longitudinal end of the wider portion 40*e*1, 40*e*2.

In some embodiments, the middle portion 41*e* includes two wider portions 41*e*1, 41*e*2 spaced apart along a length of the middle portion 41*e*. In some embodiments, each of the wider portions 41*e*1, 41*e*2 is wider than a segment of the middle portion 41*e* on each longitudinal end of the wider portion 41*e*1, 41*e*2.

The wider portions 40*e*1, 40*e*2 of the top contacts 40 and the wider portions 41*e*1, 41*e*2 of the bottom contacts 41 may be configured to minimize electrical reflection.

Specifically, the wider portions 40*e*1, 40*e*2 of the top contacts 40 and the wider portions 41*e*1, 41*e*2 of the bottom contacts 41 may be configured such that the top contacts 40 and the bottom contacts 41 match impedances of the corresponding conductive terminals 311 (shown in FIG. 8A) of the tongue 310 of the mating connector 300. Thus, the wider portions 40*e*1, 40*e*2 of the top contacts 40 and the wider portions 41*e*1, 41*e*2 of the bottom contacts 41 may reduce or eliminate electrical signal reflection upon mating of the electrical connector 200 with the mating connector 300.

Further, the wider portions 40*e*1, 40*e*2 of the top contacts 40 and the wider portions 41*e*1, 41*e*2 of the bottom contacts 41 may be configured such that the top contacts 40 and the bottom contacts 41 match impedances of the corresponding conductive traces 312 of the second circuit board 313. Thus, the wider portions 40*e*1, 40*e*2 of the top contacts 40 and the wider portions 41*e*1, 41*e*2 of the bottom contacts 41 may reduce or eliminate electrical signal reflection upon making contact with the corresponding conductive traces 312 of the second circuit board 313.

In some embodiments, the middle portion 40*e*, 41*e* of each of the top and bottom contacts 40, 41 includes a greater than about 50 degree bend 40*f*, 41*f*. Specifically, in some embodiments, the middle portion 40*e* of each of the top contacts 40 includes greater than about 50 degree bend 40*f*. In some other embodiments, the bend 40*f* may be greater than about 60 degrees, greater than about 70 degrees, greater than about 80 degrees, or greater than about 85 degrees. In the illustrated embodiment of FIG. 6, the bend 40*f* is disposed between the two wider portions 40*e*1, 40*e*2.

Further, in some embodiments, the middle portion 41*e* of each of the bottom contacts 41 includes a greater than about 50 degree bend 41*f*. In some other embodiments, the bend 41*f* may be greater than about 60 degrees, greater than about 70 degrees, greater than about 80 degrees, or greater than about 85 degrees. In the illustrated embodiment of FIG. 6, the bend 41*f* is disposed between the two wider portions 41*e*1, 41*e*2.

Further, in some embodiments, the top overmold 60 is molded over a portion of the middle portion 41*e* of the top contacts 40. In some embodiments, the top overmold 60 leaves the two wider portions 40*e*1, 40*e*2 of the top contacts 40 exposed. In other words, in some embodiments, the top overmold 60 is molded between the two wider portions 40*e*1, 40*e*2 of the top contacts 40. Further, in some embodiments, the bottom overmold 61 is molded over a portion of the middle portion 41*e* of the bottom contacts 41. In some embodiments, the bottom overmold 61 leaves the two wider portions 41*e*1, 41*e*2 of the bottom contacts 41 exposed.

Figure 8A:
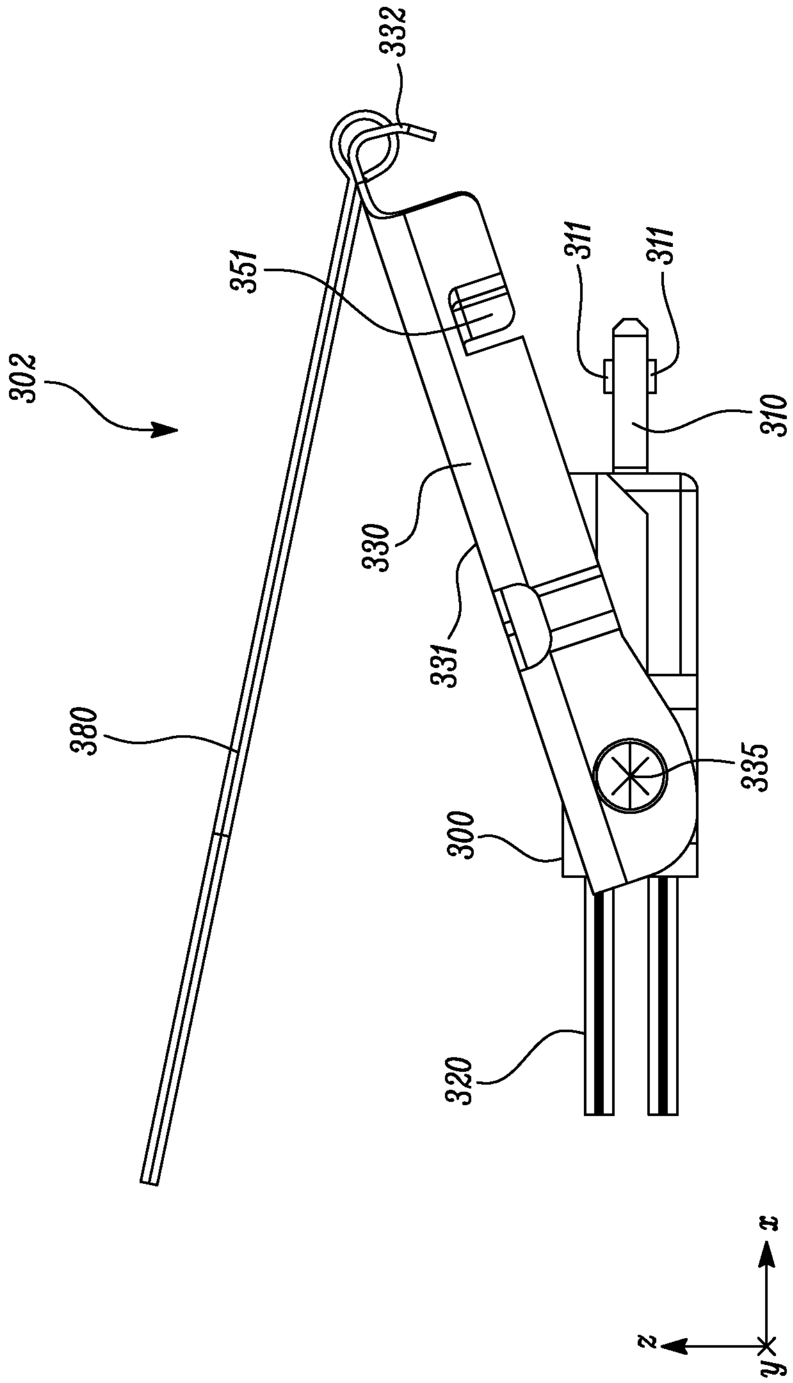
FIG. 8A is a schematic side view of a mating connector according to an embodiment of the present disclosure.

FIG. 8A illustrates a side view of the mating connector 300 according to an embodiment of the present disclosure.

In the illustrated embodiment of FIG. 8A, the mating connector 300 includes a second shield 330. The second shield 330 includes a top portion 331 and a front portion 332. In the illustrated embodiment of FIG. 8A, the second shield 330 further includes retention features 351 (only one shown in FIG. 8A).

In the illustrated embodiment of FIG. 8A, the second shield 330 is rotatably attached to the mating connector 300. In some embodiments, the second shield 330 is configured to rotate about a shield rotation axis 335 substantially perpendicular to the mating direction. In the illustrated embodiment of FIG. 8A, the shield rotation axis 335 is substantially parallel to the y-axis. The second shield 330 may be configured to rotate about the shield rotation axis 335 between an open position 302 and a closed position 301 (shown in FIG. 8C). In FIG. 8A, the second shield 330 is the open position 302.

In the illustrated embodiment of FIG. 8A, the mating connector 300 further includes a pull tab 380 rotatably attached to the second shield 330 near the front portion 332 of the second shield 330. In some embodiments, the pull tab 380 is configured to rotate about a tab rotation axis (not shown) substantially perpendicular to the mating direction. In the illustrated embodiment of FIG. 8A, the tab rotation axis may be substantially parallel to the y-axis. In some embodiments, the second shield 330 may be retained in the open position 302 using the pull tab 380.

In the illustrated embodiment of FIG. 8A, the mating connector 300 further includes at least one cable 320 including a plurality of conductors. In some embodiments, the at least one cable 320 may include a shielded flat electric cable. Further, the at least one cable 320 may include multiple segments. In some embodiments, the at least one cable 320 may include a network cable, for example, an ethernet cable. In some embodiments, a total number of the plurality of conductors of the at least one cable 320 may be varied as per desired application attributes.

The mating connector 300 further includes the tongue 310 including the corresponding conductive terminals 311. In the illustrated embodiment of FIG. 8A, the tongue 310 has a substantially rectangular shape. However, in some other embodiments, the tongue 310 may have any suitable shape, such as square, curved, triangular, polygonal, circular, elliptical, oval, and so forth, based on the desired application attributes. The conductive terminals 311 may include an electrically conductive material, such as a metal or an alloy. In some embodiments, the tongue 310 of the mating connector 300 includes a printed circuit board. Thus, in some embodiments, the conductive terminals 311 of the tongue 310 of the mating connector 300 include conductive pads formed on the printed circuit board.

Figure 8B:
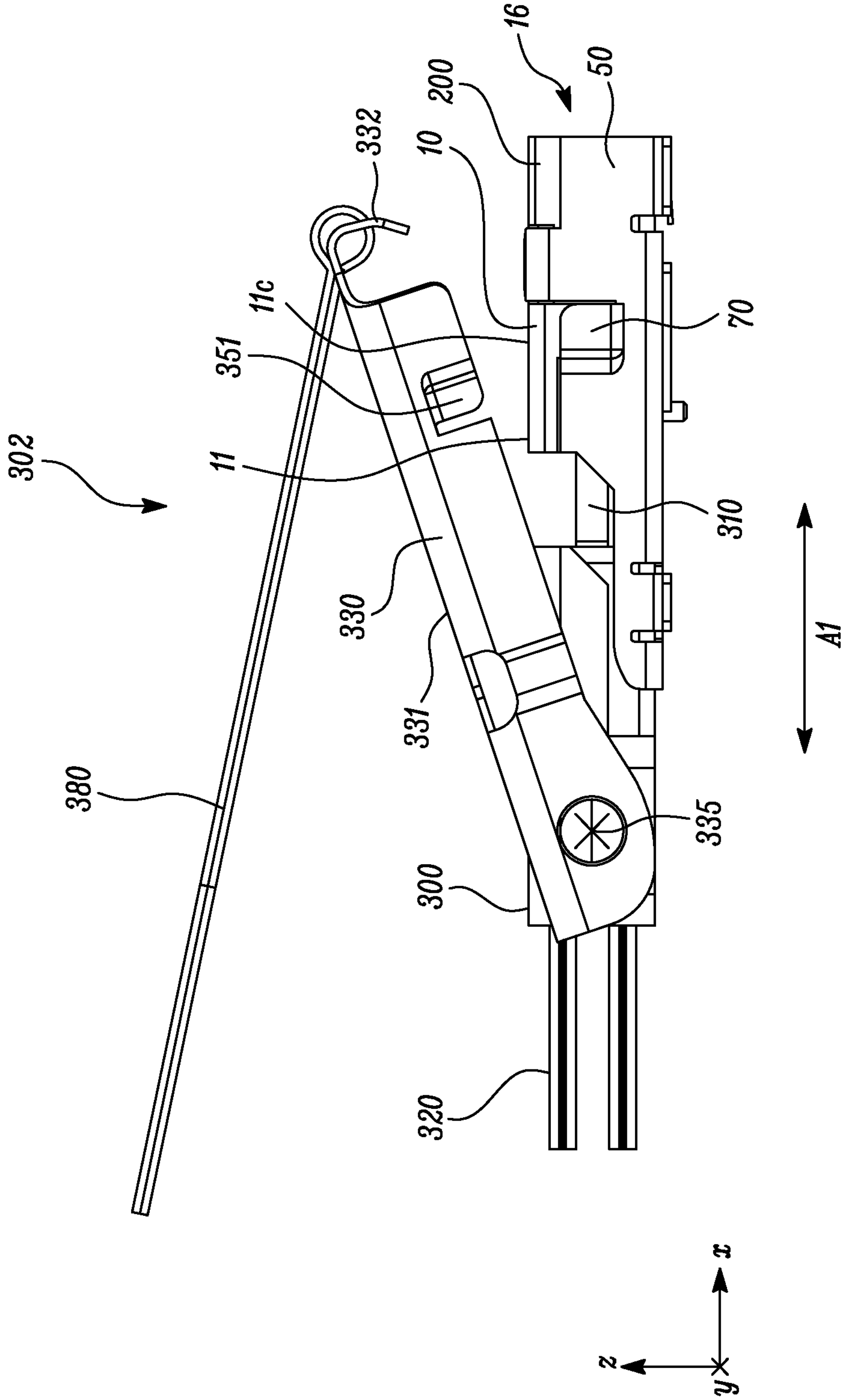
FIG. 8B is a schematic side view of the electrical connector partially mated with the mating connector according to an embodiment of the present disclosure.
Figure 8C:
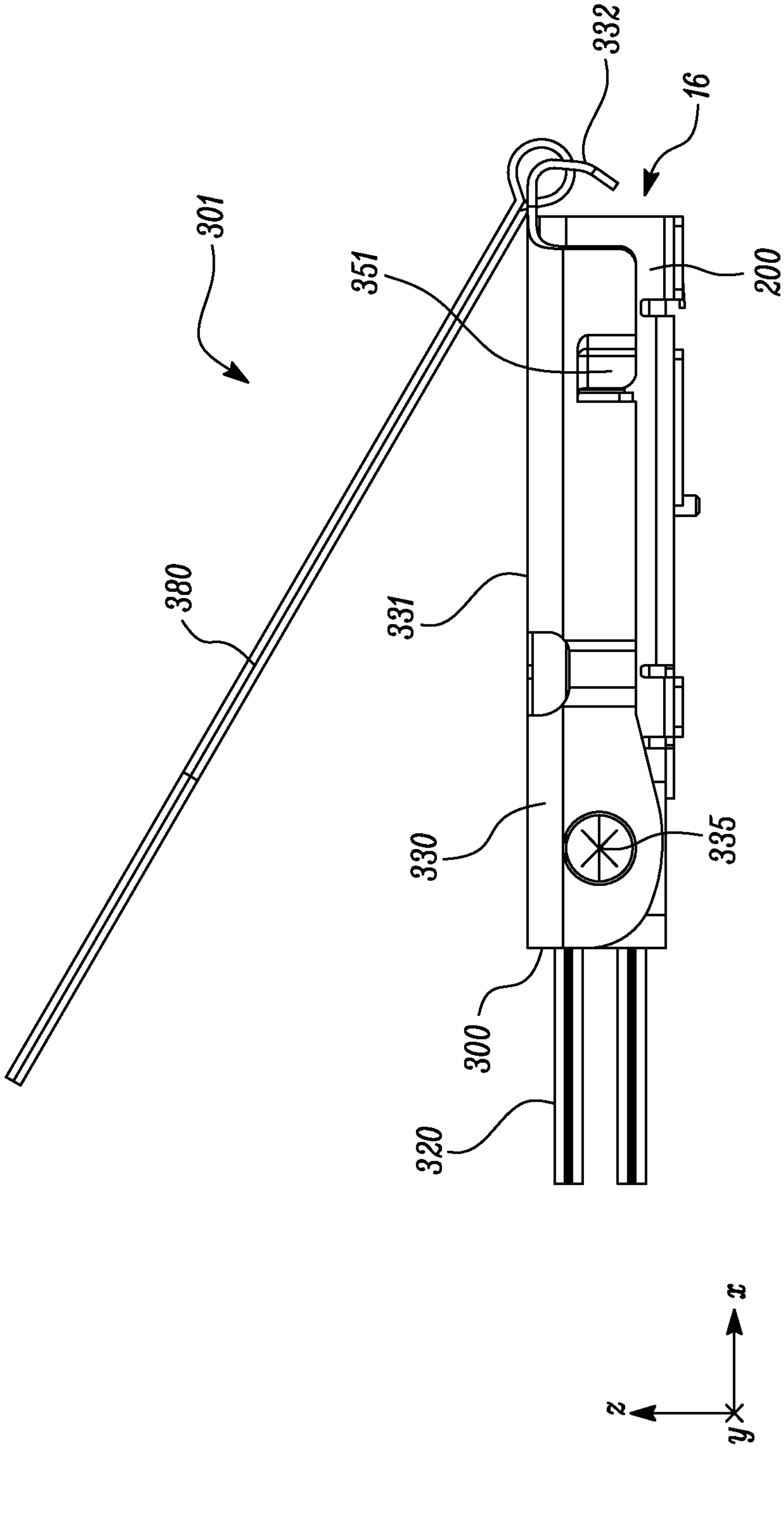
FIG. 8C is a schematic side view of the electrical connector fully mated with the mating connector according to an embodiment of the present disclosure.

FIGS. 8B and 8C illustrate side views of the mating connector 300 and the electrical connector 200 according to an embodiment of the present disclosure. In FIG. 8B, the electrical connector 200 is partially mated with the mating connector 300, and in FIG. 8C, the electrical connector 200 is fully mated with the mating connector 300.

Referring to FIG. 8B, in some embodiments, the electrical connector 200 is configured to mate with the mating connector 300 when the second shield 330 is in the open position 302. Specifically, the electrical connector 200 is configured to mate with the mating connector 300 when the second shield 330 is in the open position 302 along the mating direction. The mating direction is indicated by an arrow A1. In some embodiments, the electrical connector 200 may be configured to slidably mate with the mating connector 300, when the second shield 330 is in the open position 302, along the mating direction.

Referring to FIG. 8C, in some embodiments, when the electrical connector 200 is fully mated with the mating connector 300, the second shield 330 of the mating connector 300 is configured to rotate from the open position 302 to the closed position 301. In some embodiments, the second shield 330 may be rotated from the open position 302 to the closed position 301 using the pull tab 380.

In some embodiments, the rotation of the second shield 330 from the open position 302 to the closed position 301 results in the top portion 331 of the second shield 330 covering and shielding the exposed top surface 11*c* of the top wall 11 of the housing 10. In some embodiments, the rotation of the second shield 330 from the open position 302 to the closed position 301 results in the front portion 332 of the second shield 330 being disposed at, and covering and shielding at least a portion of, the exposed rear side 16 of the electrical connector 200.

In the illustrated embodiment of FIG. 8B, the unitary shield 50 of the electrical connector 200 further includes retention features 70 (only one shown in FIG. 8B). In some embodiments, in the closed position 301, the retention features 351 of the second shield 330 may be configured to detachably interlock with the retention features 70 of the unitary shield 50. In some cases, the retention features 351 of the second shield 330 and the corresponding retention features 70 of the unitary shield 50 may form a snap-fit engagement. This may prevent undesirable relative movement between the electrical connector 200 and the mating connector 300 upon mating of the electrical connector 200 with the mating connector 300. Therefore, the engagement of the retention features 70 of the unitary shield 50 with the retention features 351 of the second shield 330 of the mating connector 300 may prevent accidental uncoupling of the mating connection.

The exposed top surface 11*c* (shown in FIG. 8B) of the housing 10 may allow the second shield 330 of the mating connector 300 to sit flush against the exposed top surface 11*c* in the closed position 301. The electrical connector 200 coupled with the mating connector 300 may have a low profile. That is, the electrical connector 200 coupled with the mating connector 300 may possess a reduced thickness, breadth/width, length, surface area, and/or potential volume than those of conventional electrical connectors and mating connectors. Therefore, the electrical connector 200 coupled with the mating connector 300 may be accommodated in available spaces that are usually not utilized, such as a space below heat sinks.

The electrical connector 200 may further allow easy connection with the mating connector 300, which may be associated with a device or a server (e.g., 1U rack server, blade server, GPU server, etc.). Further, a mating connection between the electrical connector 200 and the mating connector 300 may provide electromagnetic shielding from external devices. Therefore, the electrical connector 200 may be suitable for use in high-speed data processing and data storage applications.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An electrical connector configured to mate with a mating connector along a mating direction and comprising:

an electrically insulative unitary housing comprising a central slot defined by top, bottom and opposing side walls, the central slot extending along the mating direction between an open front end near a mating side of the housing for receiving a tongue of the mating connector and open top and bottom rear ends separated by a divider of the housing and disposed near a rear side, opposite the mating side of the housing, the open front and top and bottom rear ends substantially co-extensive with each other in length extending along a lateral direction substantially orthogonal to the mating direction;

pluralities of top and bottom contacts disposed in the central slot at respective top and bottom surfaces of the central slot for making contact with corresponding conductive terminals of the tongue of the mating connector; and an electrically conductive unitary shield removably assembled to the housing along the mating direction from the rear side of the housing, the shield comprising a base shield substantially covering an entire bottom surface of the bottom wall of the housing and extending forwardly beyond the mating side of the housing to define an exposed planar portion of the base shield, and opposing side shields extending upwardly from corresponding opposing side edges of the base shield and substantially covering the corresponding side walls of the housing, each of the side shields comprising a curved first engagement feature at least partially disposed in an opening defined at a corresponding side edge of the top wall, the unitary shield leaving substantially an entire top surface of the top wall of the housing and the rear side of the housing exposed.

2. The electrical connector of claim 1 further comprising a continuous top overmold molded over a portion of each of the top contacts, the top overmold substantially sealing the open top rear end of the central slot.

3. The electrical connector of claim 2, wherein the top overmold is substantially L-shaped.

4. The electrical connector of claim 2, wherein the top overmold has a first portion substantially parallel to the mating and lateral directions and molded over a first portion of each of the top contacts, and a second portion extending downwardly from an end of the first portion and molded over a different second portion of each of the top contacts.

5. The electrical connector of claim 1 further comprising a continuous bottom overmold molded over a portion of each of the bottom contacts, the bottom overmold substantially sealing the open bottom rear end of the central slot.

6. The electrical connector of claim 1, wherein each of the top and bottom contacts comprises:

a contact portion for making contact with a corresponding conductive terminal of the tongue of the mating connector;

a mounting portion for making contact with a corresponding conductive trace of a second circuit board; and a middle portion extending between the contact and mounting portions, the middle portion comprising two wider portions spaced apart along a length of the middle portion, each of the wider portions being wider than a segment of the middle portion on each longitudinal end of the wider portion.

7. The electrical connector of claim 6, wherein the middle portion of each of the top and bottom contacts comprises a greater than about 50 degree bend, and wherein the bend is disposed between the two wider portions.

8. The electrical connector of claim 1, wherein the divider extends continuously between the opposing side walls of the housing.

9. The electrical connector of claim 1, wherein when the electrical connector is fully mated with the mating connector, a second shield of the mating connector is configured to rotate from an open position to a closed position, resulting in:

a top portion of the second shield covering and shielding the exposed top surface of the top wall of the housing; and a front portion of the second shield being disposed at, and covering and shielding at least a portion of, the exposed rear side of the electrical connector.

10. The electrical connector of claim 1, wherein the tongue of the mating connector comprises a printed circuit board.

11. The electrical connector of claim 10, wherein the conductive terminals of the tongue of the mating connector comprise conductive pads formed on the printed circuit board.

12. An electrical connector configured to mate with a mating connector along a mating direction and comprising:

an electrically insulative unitary housing comprising a central slot extending from an open front end near a mating side of the housing for receiving a tongue of the mating connector to open top and bottom rear ends disposed near a rear side, opposite the mating side of the housing, the open front and top and bottom rear ends substantially co-extensive with each other in length extending along a lateral direction substantially orthogonal to the mating direction;

pluralities of top and bottom contacts, wherein each of the top and bottom contacts comprises a contact portion, a mounting portion, and a middle portion extending between the contact and mounting portions and comprising two wider portions spaced apart along a length of the middle portion, each of the wider portions being wider than a segment of the middle portion on each longitudinal end of the wider portion;

an electrically conductive unitary shield substantially covering an entire bottom surface of a bottom wall and opposing side walls of the housing, and leaving substantially an entire top surface of a top wall and the rear side of the housing exposed; and continuous top and bottom overmolds molded over respective portions of the top and bottom contacts and substantially sealing the respective open top and bottom rear ends of the central slot, wherein the top and bottom overmolds leave the two wider portions of each of the top and bottom contacts exposed.

* * * * *